United States Patent
Coleman, Jr. et al.

(10) Patent No.: US 10,052,754 B1
(45) Date of Patent: Aug. 21, 2018

(54) MAGNETIC TOOL HOLDER

(71) Applicant: Ullman Devices Corporation, Ridgefield, CT (US)

(72) Inventors: Edward S. Coleman, Jr., Ridgefield, CT (US); Stanley S. Stromski, Riverhead, NY (US)

(73) Assignee: Ullman Devices Corporation, Ridgefield, CT (US)

( * ) Notice: Subject to any disclaimer, the term of this patent is extended or adjusted under 35 U.S.C. 154(b) by 0 days.

(21) Appl. No.: 15/485,553

(22) Filed: Apr. 12, 2017

(51) Int. Cl.
  *A47F 7/00* (2006.01)
  *B25H 3/00* (2006.01)
  *B25H 3/04* (2006.01)
  *F16B 1/00* (2006.01)

(52) U.S. Cl.
  CPC .............. *B25H 3/003* (2013.01); *B25H 3/04* (2013.01); *F16B 1/00* (2013.01); *F16B 2001/0035* (2013.01); *Y10S 211/01* (2013.01)

(58) Field of Classification Search
  CPC ........ B25H 3/003; B25H 3/04; B25J 15/0608; F16B 1/00; F16B 2001/0035; Y10S 211/01
  USPC ....... 206/378, 376, 373, 372, 350, 477, 478, 206/481; 248/683, 206.5, 309.4, 689, 248/316.1; 211/70.6, DIG. 1; 294/65.5
  See application file for complete search history.

(56) References Cited

U.S. PATENT DOCUMENTS

| | | | | |
|---|---|---|---|---|
| 1,432,822 A | * | 10/1922 | Wood | B25B 7/00 294/65.5 |
| 1,587,335 A | * | 6/1926 | Kline | B42F 9/00 206/477 |
| 2,493,846 A | * | 1/1950 | Andrews | D06F 9/02 108/28 |
| 2,565,624 A | * | 8/1951 | Phelon | A47G 21/14 211/1 |
| 2,565,625 A | * | 8/1951 | Phelon | A47G 21/14 211/1 |
| 2,697,804 A | * | 12/1954 | Phelon | B25H 3/04 211/70.6 |
| 2,733,113 A | * | 1/1956 | Humbargar | A47B 81/007 206/45.24 |
| 2,869,047 A | * | 1/1959 | Smit | B23Q 3/1546 335/285 |
| 2,954,257 A | * | 9/1960 | Besuch | B23Q 3/1546 248/206.5 |
| 2,966,992 A | * | 1/1961 | Dunkelberger | B25H 3/04 211/1 |

(Continued)

FOREIGN PATENT DOCUMENTS

CA    2844017 A1 *   2/2012   ............... A47G 1/17

*Primary Examiner* — Jonathan Liu
*Assistant Examiner* — Devin K Barnett

(57) ABSTRACT

A magnetic tool holder includes a body having a bottom and side walls defining an elongate central channel, wherein the bottom defines a first plane and ends of the side walls define a second plane, wherein the body further includes side edges laterally extending from said side walls in the second plane, and outer side walls extending from the side edges back to the first plane; and at least one magnet in the elongate central channel, the at least one magnet having a tool securing surface positioned substantially coplanar with the second plane. The outer side walls configured in this manner greatly increase the magnetic flux in both planes or surfaces of the holder.

15 Claims, 2 Drawing Sheets

(56) References Cited

U.S. PATENT DOCUMENTS

| | | | | |
|---|---|---|---|---|
| 3,014,751 A | * | 12/1961 | Smith | B23Q 3/1546 294/65.5 |
| 3,111,736 A | * | 11/1963 | Budreck | A44B 15/002 24/303 |
| 3,419,832 A | * | 12/1968 | Baermann | B25H 3/04 206/818 |
| 3,599,358 A | * | 8/1971 | Butts | D06F 81/003 219/242 |
| 3,842,980 A | * | 10/1974 | Kushner | B25H 3/04 211/DIG. 1 |
| 3,868,016 A | * | 2/1975 | Szpur | A61B 50/20 206/350 |
| 4,011,944 A | * | 3/1977 | Cooley | A61B 50/13 206/370 |
| 4,544,067 A | * | 10/1985 | Miller | B25H 3/04 211/70.6 |
| 4,589,552 A | * | 5/1986 | Chevalier | B65D 5/0245 206/424 |
| 4,785,936 A | * | 11/1988 | Shpigelman | H05K 13/0069 206/449 |
| 4,802,580 A | | 2/1989 | Andersen | |
| 4,953,714 A | * | 9/1990 | Paul | A47F 5/0884 211/36 |
| 5,228,570 A | | 7/1993 | Robinson | |
| 5,306,467 A | * | 4/1994 | Douglas-Hamilton | B01L 9/50 211/DIG. 1 |
| 5,316,143 A | * | 5/1994 | Horn | B25H 3/06 206/350 |
| 5,375,717 A | * | 12/1994 | Roshdy | B65D 73/0021 206/363 |
| 5,456,359 A | * | 10/1995 | Horn | B25H 3/06 206/350 |
| 5,501,342 A | | 3/1996 | Geibel | |
| 5,544,747 A | * | 8/1996 | Horn | B25H 3/06 206/350 |
| 5,630,517 A | * | 5/1997 | Maznik | A45D 20/12 211/70.6 |
| 5,669,516 A | * | 9/1997 | Horn | B25H 3/06 206/350 |
| 5,743,394 A | | 4/1998 | Martin | |
| 5,746,329 A | * | 5/1998 | Rondeau | A47G 1/17 211/123 |
| 5,896,729 A | | 4/1999 | Bell et al. | |
| 5,921,405 A | * | 7/1999 | Dumas | G11B 33/0483 211/40 |
| 6,006,906 A | * | 12/1999 | Winnard | B25H 3/06 206/350 |
| 6,073,766 A | * | 6/2000 | Winnard | B25H 3/06 206/350 |
| 6,092,655 A | * | 7/2000 | Ernst | B25H 3/003 206/378 |
| 6,095,329 A | | 8/2000 | Kao | |
| 6,098,799 A | | 8/2000 | Lee | |
| 6,155,438 A | * | 12/2000 | Close | A47F 1/125 211/119.003 |
| 6,434,894 B2 | * | 8/2002 | Reymann | B28B 7/0017 249/139 |
| 6,471,273 B1 | * | 10/2002 | Friedrich | B66C 1/04 294/65.5 |
| 6,571,669 B2 | | 6/2003 | Benatz et al. | |
| 6,571,966 B1 | | 6/2003 | Hsiao | |
| 6,614,337 B1 | | 9/2003 | Winnard | |
| 6,719,155 B1 | * | 4/2004 | Chang | B25H 3/04 206/350 |
| 6,905,015 B2 | * | 6/2005 | Hernandez, Jr. | B25H 3/023 206/373 |
| 6,923,317 B2 | | 8/2005 | Coleman, Jr. et al. | |
| 7,172,079 B1 | * | 2/2007 | Shiao | B25H 3/04 206/350 |
| 7,190,248 B2 | * | 3/2007 | Coleman, Jr. | B25B 11/002 206/350 |
| 7,331,455 B2 | * | 2/2008 | Lin | B25H 3/003 206/372 |
| 7,419,131 B2 | * | 9/2008 | Von Limburg | B28B 7/00 249/139 |
| 7,900,771 B1 | * | 3/2011 | Meng | B25H 3/06 206/372 |
| 7,987,975 B1 | * | 8/2011 | Lee | B25H 3/04 206/376 |
| 7,987,981 B1 | * | 8/2011 | Lee | B25H 3/04 206/372 |
| D646,042 S | * | 9/2011 | Hatcher | D34/27 |
| 8,499,943 B1 | * | 8/2013 | Neldner | A47J 45/02 206/818 |
| 8,544,830 B2 | * | 10/2013 | Sladojevic | B25B 11/002 219/205 |
| 8,618,898 B2 | * | 12/2013 | Noble | 335/289 |
| 8,651,436 B2 | * | 2/2014 | Inoue | F16L 3/2332 24/132 R |
| 8,672,276 B2 | * | 3/2014 | Fukumoto | F16L 3/2235 248/316.1 |
| 8,702,079 B2 | * | 4/2014 | Sladojevic | B25B 11/002 249/40 |
| D703,999 S | * | 5/2014 | Delassus | D7/394 |
| 8,852,524 B2 | * | 10/2014 | Guo | G02B 21/34 422/500 |
| 8,866,573 B2 | * | 10/2014 | Haritou | B25B 11/002 294/65.5 |
| 9,202,615 B2 | * | 12/2015 | Fullerton | H01F 7/04 |
| 9,560,923 B1 | * | 2/2017 | Winnard | A47F 5/0823 |
| 2004/0050735 A1 | * | 3/2004 | Coleman, Jr. | B25H 3/003 206/378 |
| 2004/0238466 A1 | * | 12/2004 | Shiao | B25H 3/04 211/70.6 |
| 2008/0314795 A1 | * | 12/2008 | Lin | B25H 3/00 206/759 |
| 2009/0127146 A1 | * | 5/2009 | Krebs | B25H 3/04 206/373 |
| 2011/0031145 A1 | * | 2/2011 | Larson | B25H 3/003 206/372 |
| 2011/0073509 A1 | * | 3/2011 | Palmer | A45C 11/324 206/372 |
| 2011/0221147 A1 | * | 9/2011 | Hatcher | B62B 5/06 280/47.31 |
| 2016/0195117 A1 | * | 7/2016 | Yeh | F16M 11/041 24/303 |
| 2017/0021494 A1 | * | 1/2017 | Buxton | B25J 1/02 |

\* cited by examiner

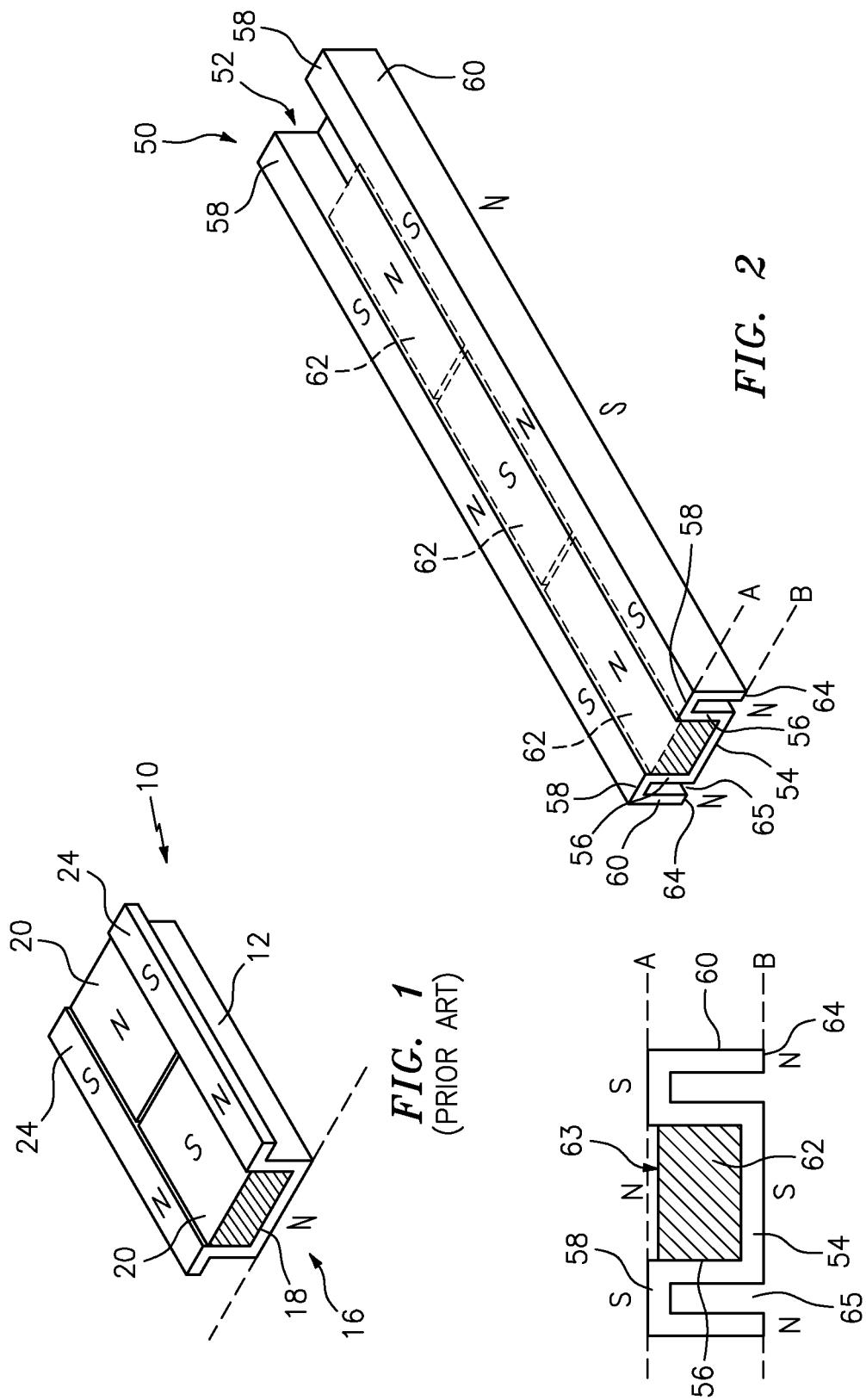

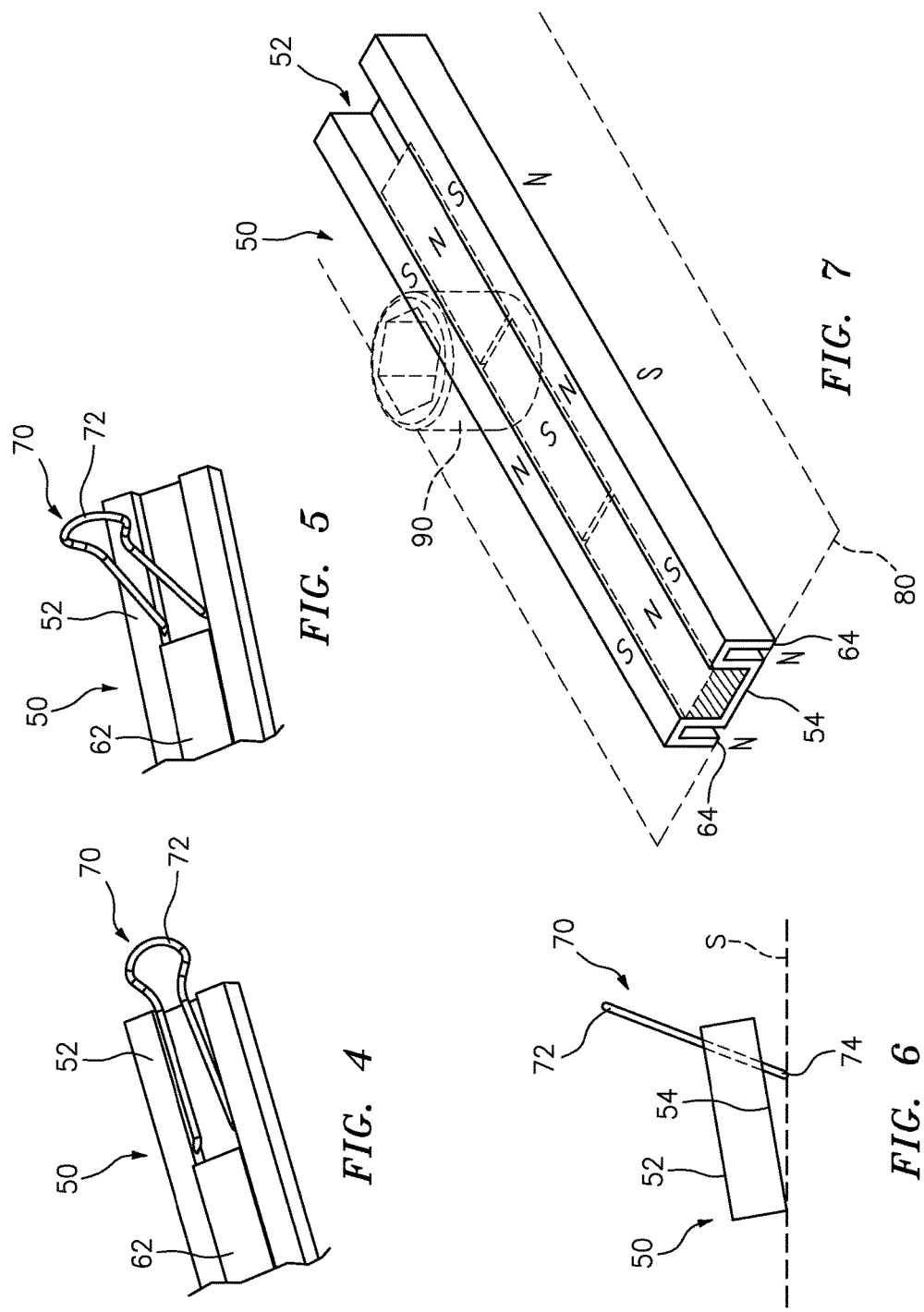

MAGNETIC TOOL HOLDER

BACKGROUND OF THE INVENTION

The invention relates to a magnetic tool holder and, more particularly, to a magnetic holder for sockets and similar tools which can advantageously secure various different types, sizes and shapes of ferrous tool components.

Tool holders such as socket wrench holders and the like are used for organizing socket wrenches and components thereof, and such tools are typically used in a wide variety of fields such as automobile repair, home repair and the like.

Various different types of socket holders include attachment structures which are difficult to manipulate with a single hand, and further are positioned in cases, tool boxes or various other structures which can only be positioned on flat surfaces. These issues make the use of such tools difficult under certain circumstances, and it is therefore clear that the need remains for improved devices for releasably holding tools and tool components for convenient access by the tool user.

U.S. Pat. No. 6,923,317 discloses a holder having magnets arranged in an elongate channel to magnetically secure tools. While this holder does provide for suitable holding of tools such as sockets for a socket wrench set and the like, there is still a need for improvement of such a device.

SUMMARY OF THE INVENTION

In accordance with the present invention, a magnetic tool holder is provided which has improved holding force, security and stability when mounted to a work surface as compared to the device of U.S. Pat. No. 6,923,317.

According to the invention, a magnetic tool holder is provided which comprises a body having a bottom and side walls defining an elongate central channel, wherein the bottom defines a first plane and ends of the side walls define a second plane, wherein the body further comprises side edges laterally extending from said side walls in the second plane, and outer side walls extending from the side edges back to the first plane; and at least one magnet in the elongate central channel, said at least one magnet having a tool securing surface positioned substantially coplanar with said second plane.

The ends of the outer side walls as recited above define additional contact points in the first plane, which is the plane at which the holder is secured to a ferrous surface. The additional spaced points give the holder a greatly increased holding force to the surface, and also provide greater stability to the device against tipping over, for example, due to the weight of objects secured thereto, tipping forces from removing an object from the holder, or both.

BRIEF DESCRIPTION OF THE DRAWINGS

A detailed description of preferred embodiments of the present invention follows, with reference to the attached drawings, wherein:

FIG. 1 illustrates a tool holder according to U.S. Pat. No. 6,923,317;

FIG. 2 is a perspective view of a portion of a magnetic tool holder in accordance with the present invention;

FIG. 3 is a cross section taken through a magnetic tool holder in accordance with the present invention;

FIG. 4 is a perspective view of an alternative embodiment of a magnetic tool holder in accordance with the present invention, including a clip in a closed position;

FIG. 5 illustrates the magnetic tool holder of FIG. 4 with the clip in an open position;

FIG. 6 is a side view of the apparatus of FIG. 4 having the clip in an open position; and FIG. 7 is a perspective illustration of a magnetic tool holder in accordance with the present invention in an environment of use.

DETAILED DESCRIPTION

The invention relates to a magnetic tool holder which advantageously can magnetically secure sockets and other ferrous tools, whereby the shape and size of the tools is not an obstruction to securing such tools on the holder, wherein the tools are easily released from the tool holder in a single-handed maneuver, and wherein the holder itself can be securely positioned to any ferrous support surface, be it horizontal or otherwise.

In addition, the magnet and body portion structure of the tool holder as will be described below greatly enhances the magnetic holding ability of the tool holder such that sockets, wrenches and the like are securely held on the holder. The structure of the holder of the present disclosure, as compared to that of the prior art (see FIG. 1), produces a structure which greatly increase the holding force to a ferrous support surface, and also greatly enhances the stability of the holder according to the invention, when secured to such a surface, against tipping over.

Referring to FIG. 1, a known magnetic tool holder 10 is illustrated and includes a body portion 12 and can include a handle member or grip member (not shown). Further details of this holder can be found in U.S. Pat. No. 6,923,317, which is incorporated herein by reference.

Body portion 12 is an elongate member having a central portion 16 which defines a channel 18 for holding magnets 20 positioned along channel 18.

Body portion 12 also has side edges 24 which extend laterally from central portion 16 in a plane. Magnets 20 are substantially flat magnets having surfaces 26, preferably planar surfaces 26, which are positioned in a plane with side edges 24 to hold ferrous objects such as sockets, socket wrenches and the like.

FIG. 2 illustrates a holder 50 in accordance with the present invention. Holder 50 has a body 52 having a bottom 54 and side walls 56 which extend upwardly from bottom 54 to define an elongate central channel. Body 50 also has side edges 58 which extend laterally outwardly from side walls 56, and outer side walls 60 which extend from side edges 58 back toward the same plane in which bottom 54 is defined. At least one magnet, and in the case illustrated, a plurality of magnets 62 are positioned within the elongate central channel. Upper surfaces of magnets 62 are substantially co-planer with upper surfaces of side edges 58 and define a plane A which is a tool securing surface. Outer side walls 60 preferably terminate in ends 64 which, as noted above, terminate in the same plane B as bottom 54.

Body 52 can advantageously be made from a ferrous material such that magnetic flux from magnets 62 readily transfers through the material of body 52. This produces a holder 50 wherein the surface along plane B can advantageously be used for securing to a ferrous support surface, and wherein the surface along plane A can advantageously be used to secure various ferrous objects such as sockets, socket wrenches and the like.

Outer side walls 60 terminating in ends 64 within the same plane B as bottom 54 produces a configuration wherein magnetic attraction force from magnets 62 to a ferrous support surface in contact with the surface of plane B is dramatically increased from the configuration of FIG. 1. Further, the spaced magnetic contact points defined by ends 64 of outer sidewalls 60 create more stability for holder 50 when secured on a support surface, such that there is less likelihood or tendency of the apparatus to tip such that the entire holder comes loose from the support surface. As shown in FIGS. 2 and 3, ends 64 are spaced from base 54, defining a gap 65 in plane B between bottom 54 and each end 64. This configuration defines a three point contact with a surface to which holder 50 is to be magnetically secured.

FIG. 3 shows an end view of holder 50 in accordance with FIG. 2, and further illustrates planes A and B and the structure of body 52 according to the invention, including sidewalls 56, side edges 58, outer side walls 60 and ends 64 which are substantially co-planar with bottom 54. As shown, an upper surface 63 of magnet 62 and side edges 58 define plane A, and bottom 54 and laterally spaced ends 64 define plane B.

It should be appreciated that body 52 can advantageously be formed from a single sheet or plate of ferrous material and can be stamp formed or otherwise produced using any method of manufacture as would be known to a person of skill in the art.

FIG. 2 shows magnets 62 positioned such that the north and south poles of the magnets are alternating. That is, the magnetic pole of the alternating magnets 62 facing upward alternates N,S,N and so on. FIG. 2 also shows the corresponding magnetic polarity created in holder 52. It should be readily appreciated that in some instances it may be desirable to position magnets 52 such that all poles are aligned in the same direction, for example, all north poles face up and south poles face down, or vice versa. Either of these configurations is considered to fall within the broad scope of the present invention. However, it is preferred from the standpoint of maximum holding force for the magnets to be positioned in alternating fashion as shown in FIG. 2.

The magnets can be any suitable type of magnet, such as neodymium, or neo, magnets, ferrite (ceramic) magnets and the like, as these magnets have tremendous holding force and are relatively available in the market. Alternatives, are of course possible within the broad scope of the present invention.

FIGS. 4-7 show an additional embodiment of the present disclosure, wherein holder 50 is provided with a clip 70 which can be used for releasing holder 50 from a support surface when desired, and which can also be used to hang holder 50 from a suitable storage hook or rack, as may be desired.

Clip 70 can advantageously be a substantially rigid hardened wire structure which can be pivotably mounted to body 52. Further, and referring also to FIG. 6, clip 70 further preferably has an additional extending portion 74 which pivots downwardly out of plane B of bottom 54 and ends 64 when clip 70 is moved to the position of FIGS. 5 and 6. In this position, portion 74 extends beyond bottom 54 of holder 50 such that, when clip 70 is moved from the position of FIG. 4 to the position of FIG. 5, portion 74 contacts surface S on which holder 50 is secured, and pushes holder 50 away from surface S so as to break the magnetic hold and allow a user to more easily release the holder from a surface to which it is secured, when desired. As indicated above, clip 70 preferably additionally has a head portion 72 which can be formed in the shape of a loop so that clip 70 can be used to hang holder from a storage hook or other storage assembly.

FIG. 7 shows holder 50 in a position of use, with bottom 54 and ends 64 contacting a ferrous support surface, schematically illustrated by dashed lines at reference numeral 80. Further, a socket wrench set is shown as an example of a tool element secured to holder 50, specifically being magnetically held to magnets 62 and side edges 58. As set forth above, this configuration produces a much greater holding force of body 52 to support surface 80 as compared to the configuration of FIG. 1, and the spaced contact points of ends 64 provide additional stability of holder 50 against tipping in either of the directions indicated by the double-headed arrow in the FIG. 7.

The configuration of the present invention enhances magnetic flux along both top and bottom surfaces of holder 50 to securely hold tools and also be securely held on a work surface, for example inside a mechanic's toolbox or on drawers of such a toolbox.

The spaced points of contact on the lower surface increase the bottom holding force by as much as five times the holding force of a one contact point holder such as is shown in FIG. 1.

When a user detaches one or more tools or sockets by pulling in an upward direction, the extra holding force of the present invention also helps to reduce the chance of undesirable tilting of the entire holder during such use.

A further advantage of the disclosed device is that holder 50 can also be used in the reverse position to that which is illustrated in FIG. 7. Specifically, in this method of use of the apparatus according to the invention, the top surface of magnet 62 and side edges 58 can be positioned facing toward the surface to which apparatus 50 is secured, while bottom surface 54 and edges 64 are used to secure various objects. In this mode of use, the objects are secured with less holding force than in the configuration illustrated in FIG. 7. This can be desired when holder 50 is being used to secure tools or other items which are frequently used, and which may be small and need less holding force.

Returning to FIGS. 2 and 3, in the embodiment illustrated, the top surface 63 is shown slightly below the top surface of side edges 58. In this configuration, the apparatus still produces the advantageous additional flux according to the invention. Alternatively, these surfaces could be in fact coplanar, and these configurations together are considered to be substantially coplanar as referred to herein.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A magnetic tool holder configured to be magnetically secured to a ferrous support surface, comprising:
   a body having a bottom defining a first securing surface and a pair of inner side walls defining an elongate central channel therebetween, wherein the first securing surface defines a first plane and upper ends of the pair of inner side walls define a second plane, wherein the body further comprises a pair of side edges, each one of said pair of side edges laterally extending outward from a corresponding one of said pair of inner side walls in the second plane away from said elongate central channel, and a pair of outer side walls each extending from a corresponding one of the side edges back to the first plane, each of said pair of outer side walls being spaced apart from the first securing surface to define a void between each of said pair of outer side walls and the first securing surface, the first securing surface and bottom ends of the pair of outer side walls are configured to form a three point contact with the ferrous surface in the first plane; and at least one magnet in the elongate central channel, said at least one magnet having a bottom surface and an opposite second securing surface, said bottom surface located within the elongate central channel facing said bottom of the body;

said three point contact is configured to produce a first magnetic attraction force between said at least one magnet and the ferrous support surface;

said pair of side edges in said second plane and said second securing surface of the at least one magnet are configured to produce a second magnetic attraction force between said at least one magnet and a ferrous tool surface, said first magnetic attraction force is stronger than said second attraction force.

2. The magnetic tool holder of claim 1, wherein said body portion is constructed from a ferrous material whereby such that said bottom and said outer side walls are polarized by said at least one magnet so that said body can be releasably secured in said first plane to the ferrous support surface.

3. The magnetic tool holder of claim 1, wherein said at least one magnet comprises a plurality of magnets each having opposed flat surfaces defining north and south pole surfaces, and wherein said plurality of magnets are positioned along said elongate central channel with alternating north and south pole surfaces defining said second securing surface.

4. The magnetic tool holder of claim 1, wherein said bottom, said pair of inner side walls, said pair of side edges and said pair of outer side walls are formed from a single sheet of ferrous material.

5. The magnetic tool holder of claim 1, further comprising:
a clip pivotably mounted to the body into a release position wherein a portion of the clip extends beyond the first plane and is configured to push the body away from said ferrous support surface when the body is magnetically secured to the ferrous support surface.

6. The magnetic tool holder of claim 5, wherein said clip is loop shaped.

7. The magnetic tool holder of claim 1, wherein said second securing surface of the at least one magnet is positioned below said second plane between said first plane and said second plane.

8. The magnetic tool holder of claim 1, wherein said second magnetic attraction force acts to secure the ferrous tool surface to said magnetic tool holder, and said first magnetic attraction force acts to secure said magnetic tool holder to said ferrous support surface.

9. The magnetic tool holder of claim 1, wherein said second securing surface of the at least one magnet is positioned substantially coplanar with said second plane.

10. A magnetic tool holder configured to be magnetically secured to a ferrous support surface, comprising:
a body made from a ferrous material having a bottom defining a first securing surface and a pair of inner side walls defining an elongate central channel therebetween, wherein the first securing surface of the body defines a first plane and upper end surfaces of the pair of inner side walls define a second plane, the body further including a pair of side edges, each one of said pair of side edges laterally extending outward from a corresponding one of said pair of inner side walls in the second plane away from said elongate central channel; the body further including a pair of outer side walls each extending from a corresponding one of the side edges back to the first plane, each of said pair of outer side walls being spaced apart from the first securing surface to define a void between each of said pair of outer side walls and the first securing surface, the first securing surface and bottom ends of the pair of outer side walls are configured to form a three point contact with the ferrous support surface in the first plane;

at least one magnet in the elongate central channel, said at least one magnet having a first magnet surface and an opposite second magnet surface, said first magnet surface located within the elongate central channel facing said bottom of the body, and said second magnet surface positioned below said second plane between said first plane and said second plane; and a clip having a first bottom end and a second bottom end, wherein the first bottom end of the clip extends through one inner side wall from said pair of inner side walls and the second bottom end of the clip extends through the other inner side wall from said pair of inner side walls to pivotably mount the clip to the body, wherein the clip is configured to rotate relative to the body to push the body away from said ferrous support surface.

11. The magnetic tool holder of claim 10, wherein:
said first magnet surface and said first securing surface are configured to produce a first magnetic attraction force between said at least one magnet and the ferrous support surface;

said pair of side edges in said second plane and said second magnet surface are configured to produce a second magnetic attraction force between said at least one magnet and a ferrous tool surface; and said first magnetic attraction force is stronger than said second attraction force.

12. The magnetic tool holder of claim 11, wherein said second magnetic attraction force is configured to secure the ferrous tool surface of a tool to said magnetic tool holder, and said first magnetic attraction force is configured to secure said magnetic tool holder to said ferrous support surface.

13. The magnetic tool holder of claim 10, wherein said bottom and said outer side walls are polarized by said at least one magnet so that said body can be releasably secured in said first plane to the ferrous support surface.

14. The magnetic tool holder of claim 10, wherein said bottom, said pair of inner side walls, said pair of side edges and said pair of outer side walls are formed from a single sheet of ferrous material.

15. The magnetic tool holder of claim 10, wherein said at least one magnet comprises a plurality of magnets each having opposed flat surfaces defining north and south pole surfaces, and wherein said plurality of magnets are positioned along said channel with alternating north and south pole surfaces defining said second magnet surface.

* * * * *